United States Patent [19] [11] 3,738,510
Mason [45] June 12, 1973

[54] STICKER PLACER APPARATUS FOR PLACING STICKS

[75] Inventor: Howard C. Mason, Oregon City, Oreg.

[73] Assignee: H. C. Mason & Associates, Inc., Oregon City, Oreg.

[22] Filed: May 20, 1971

[21] Appl. No.: 145,229

[52] U.S. Cl............ 214/6 DK, 198/25, 198/33 AD, 214/6 M, 214/8.5 H
[51] Int. Cl............................................. B65g 57/26
[58] Field of Search................ 214/6 M, 6 DK, 6 P, 214/6 H

[56] References Cited
UNITED STATES PATENTS

| | | | |
|---|---|---|---|
| 2,759,615 | 8/1956 | Banks | 214/6 DK |
| 3,447,695 | 6/1969 | Krepp et al. | 214/6 DK |
| 3,531,001 | 9/1970 | Lunden | 214/6 DK |
| 3,548,895 | 12/1970 | Gentry, Jr. | 214/6 DK |
| 3,126,657 | 3/1964 | Hajos | 214/6 DK |

FOREIGN PATENTS OR APPLICATIONS

| | | | |
|---|---|---|---|
| 211,393 | 4/1968 | U.S.S.R. | 214/6 M |
| 169,557 | 11/1959 | Sweden | 214/6 M |

Primary Examiner—Robert J. Spar
Attorney—Kolisch, Hartwell & Dickinson

[57] ABSTRACT

Apparatus for placing sticks on a forming stack of lumber. Sticks are received in a depository in a scrambled condition. An unscrambling conveyor moving through the depository picks up sticks, one at a time, with such in a given oriented position. The sticks are fed to a collector, and are transferred one at a time from the collector onto a stick placement conveyor belt with lugs distributed therealong functioning to establish a laterally spaced relation of the sticks on such belt. A lower run of such belt extends over a support for the forming stack. Restraining means holding sticks in the laterally spaced relation against such lower run is operated to release the sticks whereby they fall onto the stack in properly spaced relation.

3 Claims, 5 Drawing Figures

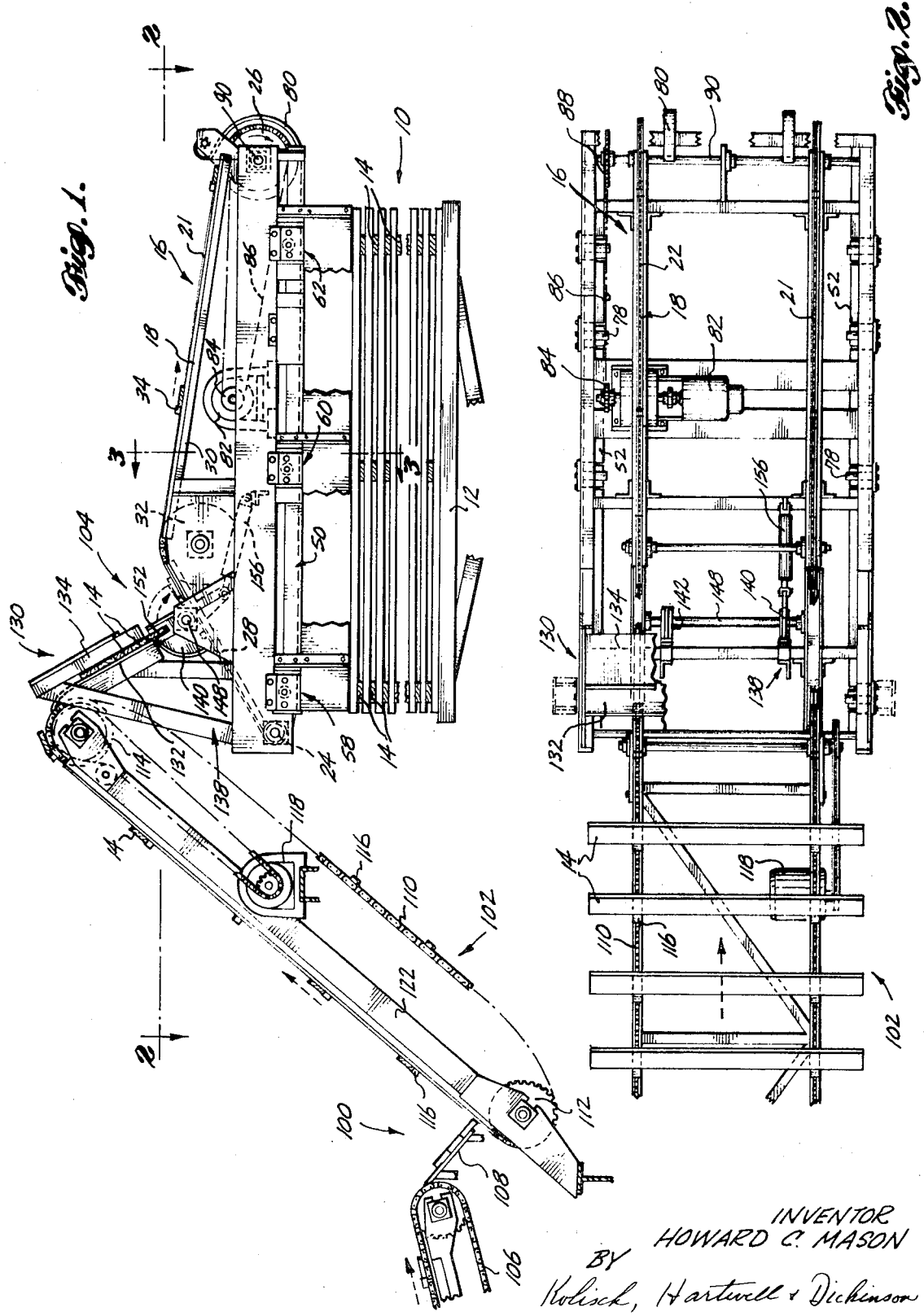

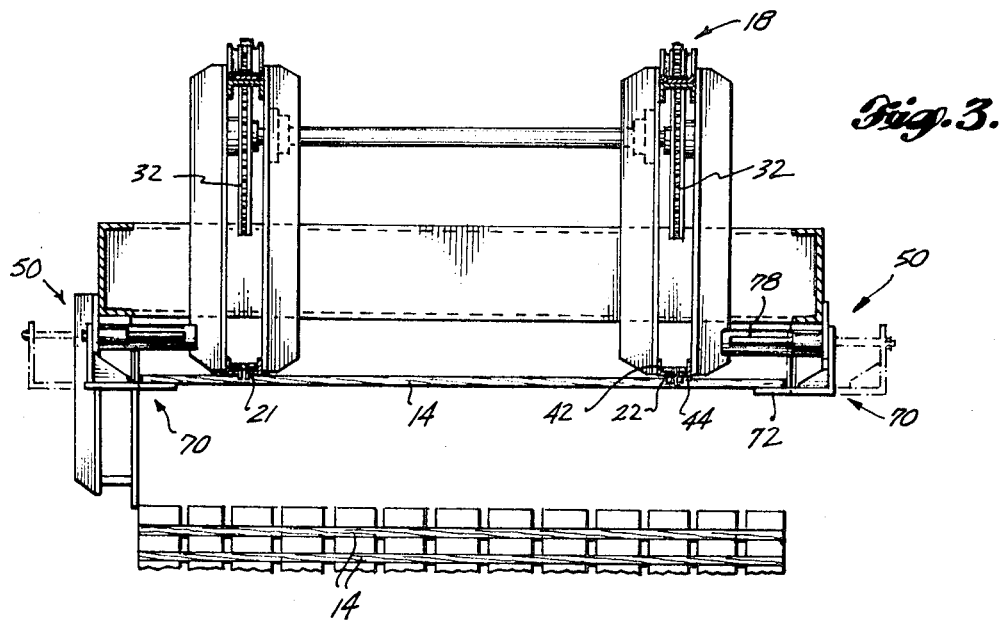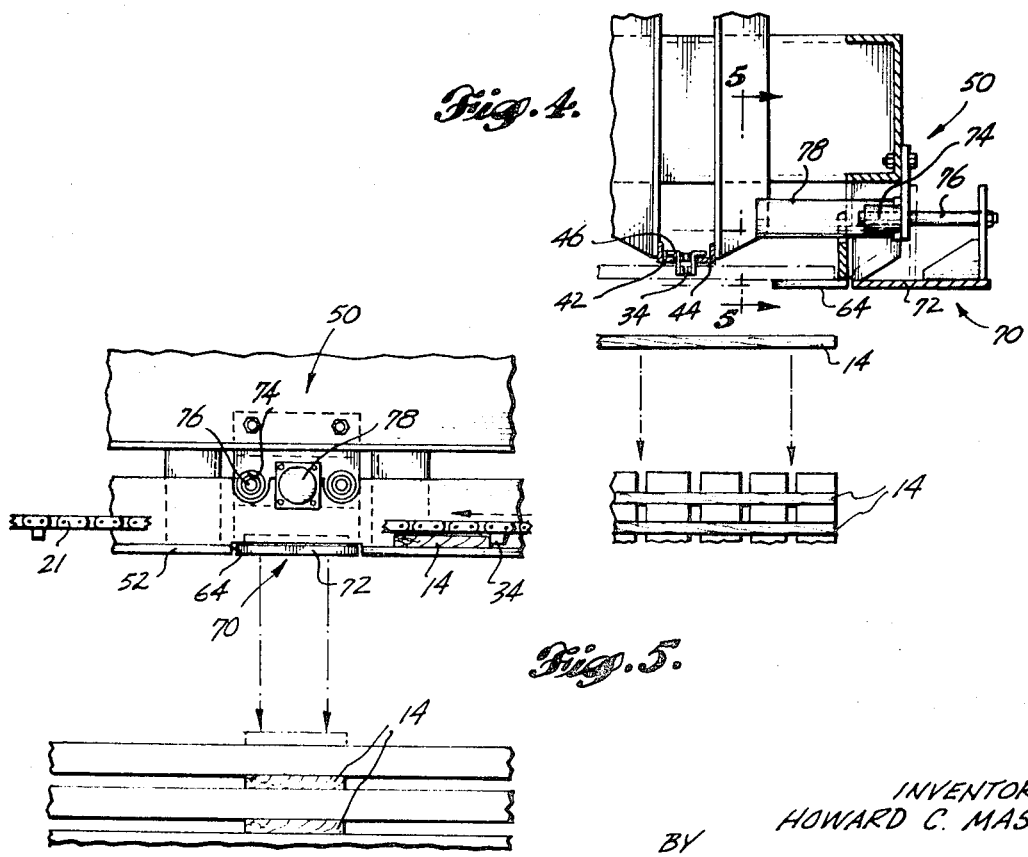

STICKER PLACER APPARATUS FOR PLACING STICKS

This invention relates to apparatus for placing so-called sticks and like objects on a forming stack. So-called sticker placers are known in the lumber industry, which are used to place sticks on a tier of lumber to provide a spacing between the tier and a succeeding tier stacked thereover. The embodiment of the invention specifically described herein concerns such a sticker placer.

It is a usual requirement that mutliple sticks are required to be placed between adjacent tiers in a forming stack. If such is done manually, obviously there is a limit to the speed at which the stack may be formed, and manpower costs are relatively high. Attempts have been made to automate the process, using a system where hoppers are provided which are actuated to deposit sticks properly positioned on a tier of lumber. With this type of system, however, the hoppers must be maintained supplied with sticks, requiring in the recycling of sticks that they be properly arranged in stacked positions within the hoppers. This is an operation which is difficult to perform other than manually.

Generally, this invention concerns novel apparatus for placing sticks on a forming stack, which will do so accurately and reliably with minimal manhandling of the sticks.

A more specific object of the invention is the provision of such apparatus featuring means for unscrambling sticks, which supplies such sticks to a stick feeding mechanism or means. Such stick feeding mechanism places the sticks on a placement conveyor, where such includes means operable to position the sticks at spaced points along the conveyor, thus to establish a laterally spaced relation in the sticks. The sticks leave this placement conveyor with the laterally spaced relation established by the conveyor, to drop onto a tier during the formation of a stack. As outlined, the construction requires no hoppers or attendants for such hoppers.

A further object and feature of the invention is the provision of novel conveyor means for placing the stickers on top of a tier of lumber or like products. The specific conveyor means disposed herein comprises an endless conveyor belt, or belts, with lugs thereon functioning to establish the lateral spacing of adjacent sticks carried by the conveyor belts. The conveyor belts have a lower reaches which extend over a support for a forming stack, and sticks are held against these lower reaches while being carried underneath it by restraining means. To enable sticks to leave the conveyor belts and drop on the forming stack, the restraining means is operated to be opened up, whereby the sticks may fall free. Thus, the sticks are removed from the conveyor belts and have the same lateral spacing upon their removal as they did while carried on such belts.

Yet another object and feature of the invention is the provision of a novel combination including a collector for holding sticks with such stacked side-by-side and means fed sticks from this collector which produces a lateral spacing of sticks, which sticks are then deposited on a forming stack.

In a related feature of the invention, such collector is fed by an unscrambling conveyor, which unscrambling conveyor received its sticks from a depository for sticks.

These and other objects and advantages of the invention will become more fully apparent from the accompanying description taken in conjunction with the accompanying drawings, wherein:

FIG. 1 is a side elevation of apparatus constructed according to an embodiment of the invention;

FIG. 2 is a plan view of apparatus shown in FIG. 1;

FIG. 3 is a view taken generally along the line 3—3 in FIG. 1;

FIG. 4 is an enlarged view of portions of FIG. 3; and

FIG. 5 is a view taken along the line 5-5 of FIG. 4.

Referring now to the drawings, illustrated therein is apparatus used in applying sticks onto the top of a tier of lumber in a forming stack, such apparatus sometimes being referred to in the industry as a "sticker placer." The stack which is being prepared is illustrated in FIG. 1 at 10. Such is supported on a stack support means, more specifically a scissor lift shown at 12 which may be lowered in steps as the height of the stack increases.

So-called sticks are shown in FIG. 1 at 14 which separate adjacent tiers in the forming stack. By including such sticks, drying of the lumber is promoted as better circulation of air about and through the stack is promoted.

The positioning of sticks in proper laterally spaced relation, and the actual placement of the sticks on a tier of lumber, are performed by what is referred to generally as placement apparatus 16, including a conveyor means shown at 18.

Considering particulars of the conveyor means 18, in the particular embodiment of the invention shown, such comprises a pair of elongated continuous chain belts 21, 22, also broadly referred to as conveyor belts. As exemplified by chain belt 21, each has opposite extremities trained over sprockets such as sprockets 24, 26. Travel of the belt when such is moved under power is with its upper reach moving from left to right in FIG. 1. Guiding travel of this upper reach, and progressing from sprocket 24, is a channel guide 28 and a channel guide 30, the guides being suitably rigidly mounted in the framework of the apparatus. A transfer wheel 32 carries the belt between guide 28 and guide 30.

Each of the belts, and with continued reference to belt 21, includes lugs such as those shown at 34 distributed at regular modular spacing therealong. The lugs of one belt are aligned, in a direction extending transversely of the belts, with the lugs of the other, and transversely aligned pairs of lugs cooperate to move a stick when placed on the belt in the direction of belt travel.

The lower reach of each belt, where such extends from sprocket 26 to sprocket 24, extends in an expanse referred to herein also as a discharge expanse, which overlies the scissor lift 12 and any stack which is being formed thereon.

The lower reach of the belts where they extend between the sprockets 26, 24, are maintained substantially horizontal by providing for each run a pair of angle iron guides, as perhaps best illustrated in FIGS. 3 and 4. The angle iron guides, given the numerals 42, 44 are suitably rigidly secured in the apparatus, and extend horizontally from adjacent one to adjacent the other of the sprockets 24, 26. The guides are spaced laterally apart from each other a slight distance, and the spacing between the guides accommodates the passage therebetween of the lugs 34. The chain belt is constructed so as to have laterally projecting wings, as demonstrated at 46, which ride on the angle iron guides thus to support the belt at the level of the guides.

Cooperating with the lower runs or reaches of the chain belts in producing conveying movement of sticks is restraining means generally indicated at 50 (see FIGS. 3, 4, and 5). Specifically describing such restraining means, in the embodiment illustrated it comprises a pair of opposed angle iron stick guides, such as the one shown at 52, for slidably supporting the ends of sticks. An angle iron stick guide is provided laterally outwardly and adjacent the lower run of each belt as best seen in FIG. 4. Sticks conveyed by the belts have ends that slide within these guides and the guides function to keep such sticks up against the undersides of the belts as they are conveyed by the belts.

Indicated at 58, 60, and 62 in FIG. 1 are drop stations utilized in the dropping of sticks onto an underlying tier. The stations in a stick guide are spaced from each other the same distance as are the lugs, and a similar series of stations is provided for each stick guide.

Considering in further detail each drop station, at the location of the drop station the stick guide is notched by providing an opening in the lower flange of the stick guide. The opening in FIGS. 4 and 5, is shown at 64, and is sufficient to accommodate the passage therethrough of the end of a stick.

Also part of each drop station is a power-operated gate, such as that shown at 70. The gate includes a plate 72 movable in and out of the opening which is provided in the stick guide at the drop station. Guiding the gate for reciprocating movement in a direction extending transversely of the stick guide are guide tubes and rods 74, 76. Movement of the gate under power may be done by a remotely controllable power-actuated means, such as the air cylinder shown at 78.

Where the chain belts extend about sprockets 26, sticks are maintained snugly against the belts by curved springs 80 (see FIG. 1), one being provided adjacent each belt. Each spring extends in an arcuate sweep.

Shown at 82 in FIGS. 1 and 2 is a motor and clutch used in intermittently driving the chain belts 21, 22. Power from the motor is delivered to a sprocket 84 and by chain 86 to a sprocket 88 secured to shaft 90. Sprockets 26 training the conveyor belts are secured to shaft 90.

Generally describing the operation of placement apparatus 16, sticks are placed on the chain belts in advance of each cooperating set of lugs, and with advancing movement of the chain belts, such sticks are carried onto the restraining means 40. With the chain belts positioned so that the sticks carried by such lugs occupy drop stations 58, 60, and 62, travel of the belts is stopped. If the various gates are then simultaneously opened, by actuating them so that their plate 72 moves free of the notches, this permits the sticks to drop free of the chain belts. Such sticks then have on the lumber stack the laterally spaced relation that they had on the chain belts.

This invention further contemplates apparatus for supplying sticks, one at a time, to the chain belts whereby such may be picked up one at a time by complimenting pairs of lugs carried by these belts. In general terms, this apparatus comprises a depository for sticks shown at 100, what is referred to as an unscrambler given the reference numeral 102, and what is referred to as a feed means for collecting sticks with such stack side-by-side and feeding them one at a time to the chain belts, given the reference numeral 104.

Considering now in more detail the above-indicated structure, sticks ultimately to be used in the separation of tiers travel into the apparatus on a conveyor 106. Such is conventional and operates to carry sticks deposited across the conveyor into depository 100.

Depository 100 may comprise a sloping floor 108, which collects sticks falling off conveyor 106. The sticks, while generally oriented so as to appear endo in FIG. 1, collect in a somewhat scrambled state as they fall from the conveyor.

Unscrambler 102 comprises an unscrambling conveyor 110. Such includes belts as represented by belt 110 disposed side-by-side and trained at opposite extremities over sprockets 112, 114. Secured to the belts at spaced points therealong are lugs or dogs, 116, the lugs on the various chains being in transverse alignment whereby a set of lugs provides for the support of a stick moving up the conveyor. Movement of the conveyor is under power through energizing of motor 118.

The upper reaches of the belts in FIG. 1, which are moving in the direction of the arrow or upwardly, are supported during their travel from sprocket 112 to sprocket 114 on a channel guide such as the one shown at 122.

The lugs on the belts are of a size only sufficient to pick up one stick at a time. As a consequence, and with a scrambled mass of sticks in the depository, and with operation of the unscrambler 102, one stick at a time tends to be picked up by succeeding sets of lugs to be carried to the upper or discharge end of the unscrambling conveyor. The sticks so picked up are all oriented in a positon parallel to each other or normal to the direction of travel of the conveyor.

Feed means 104 comprises a chute 130 including a floor 132 and rails such as the one shown at 134 forming the opposite side of the chute. Sticks falling off the discharge end of the unscrambling conveyor move onto floor 132 and tend to form a stack, with such sticks resting on edge and one against the other, as illustrated in the FIG. 1. This portion of the feed means constitutes a collector, serving to collect and to hold a supply of sticks with such all parallel to each other and in an unscrambled state, for delivery, one at a time, onto the placement conveyor 18.

Also part of feed means 104 is transfer means 138 comprising a pair of transfer wheels 140, 142 mounted on a common shaft 148. The shaft is journaled in place, and rotation of the shaft produces simultaneous rotation of transfer wheels 140, 142.

The two transfer wheels include a pocket, or seat, in the form of a notch 152 extending inwardly from the periphery of a wheel. With the wheels positioned as shown in solid outline in FIG. 1, such notches are directly underneath chute 130 in a position to have a stick dropped thereinto from the chute. The two transfer wheels are rotatable over approximately a 90° angle by actuation of ram 156, to place the notches in a discharging position, as shown in dashed outline in FIG. 1. In this position, the stick residing within the notches is supported slightly above the chain belts in the placement conveyor, in a position to be engaged by a set of lugs being carried up against the back edge thereof by these chain belts. On such occurring, the stick is moved out of the notches to travel forwardly with these chain belts.

With the wheels moved to the discharging position just described, the perimeters of the wheels move under the base of the chute 130 to prevent any additional sticks from falling from the chute. It is not until the wheels have been returned to their original receiving position that stick transfer into the notches can take place.

Very briefly describing the operation of the apparatus as a whole, which should be apparent from this description, sticks are moved into the depository and collect there in a semiscrambled state. With operation of the unscrambling conveyor 110, sticks are picked up one at a time with all of such sticks being generally horizontally disposed and extending transversely of the unscrambling conveyor. The sticks then are deposited within the collector of the feed means 104, to be collected as a stack with the sticks on edge and resting side-by-side.

Through a suitable control means, not shown, or by manual controls, the transfer wheels are actuated to take one stick at a time and hold such in a position overlying the upper reaches of the chain belts 21, 22. With advancing movement of the chain belts, as successive sets of lugs move against the sticks, these sticks are carried forwardly. Such sticks have laterally offset relation as described earlier.

The sticks are carried by the chain belts 21, 22 until three sticks are in registry with the drop stations 58, 60, 62 at which time advancing movement of the chain belts stops. At the appropriate time, as controlled by an operator, or by automatic means, the drop gates open to permit the three sticks to drop to the tier of lumber therebelow.

After such has occurred, the scissor lift or other elevatable platform is lowered and another tier of lumber is placed over those sticks by a fork lift truck or other instrumentality. The gates in the various drop stations are returned to their closed position and the placement conveyor is again started to move another series of sticks into registry with the three drop stations. The cycle of operation just described is then repeated.

It will be seen that with the apparatus of the invention, the need for organizing sticks and placing them in hoppers is eliminated. Sticks progress smoothly from their time of deposit into the depository to be singled out by the unscrambler and feed means 104 and then to be spaced laterally apart from each other by the placement conveyor for final deposit. The sticks, when placed, are placed accurately and rapidly, thus promoting rapid stacking of the lumber with stickers between the various tiers.

While a particular embodiment of the invention has been described, it should be obvious that variations are possible without departing from the invention.

It is claimed and desired to secure by Letters Patent:

1. Apparatus for placing sticks on a forming stack comprising
    a depository for sticks,
    an unscrambling conveyor device with seats thereon for receiving sticks and movable through said depository whereby single sticks become seated on the unscrambling conveyor device,
    a chute with a feed end positioned to receive sticks deposited therein by the unscrambling conveyor device and constructed to hold such sticks side-by-side and substantially horizontal,
    a transfer device at the base of said chute including a seat,
    a stick placement conveyor belt with lugs thereon distributed along the conveyor belt, said placement conveyor belt having upper and lower reaches,
    said transfer device having one position wherein its said seat is in position to recieve a stick from said chute and another position where said seat holds a stick with the stick placed in the path of a lug carried by the upper reach of said placement conveyor belt,
    restraining means for holding sticks against the lower reach of the placement conveyor belt including an apertured stationary stick guide substantially paralleling said lower reach, and
    remotely controlled mechansim for opening up said restraining means whereby sticks are free to drop clear of the restraining means and of said belt including power-operated gate structure shiftable to open up the aperture in said guide.

2. The apparatus of claim 1, wherein said transfer device comprises a pair of notched wheels with the notches of said wheels aligned in a direction extending transversely of said placement conveyor belt and forming said seat of said transfer device, the said wheels being rotatable in unison with movement of said device from its said one to its said other position.

3. Apparatus for placing spacing sticks in a forming stack of lumber comprising
    a stick placement conveyor belt with lugs thereon distributed along the conveyor belt, said placement conveyor belt having upper and lower reaches,
    restraining means for holding sticks against the lower reach of the placement conveyor belt including an apertured stationary stick guide having a plurality of apertures substantially paralleling said lower reach,
    remotely controlled mechanism for opening up said restraining means whereby sticks are free to drop clear of the restraining means and of said belt including power-operated gate structures shiftable to open up the plurality of apertures in said guide,
    a chute disposed above said upper reach of the placement conveyor belt for holding a supply of sticks with such stacked side by side in said chute,
    a rotatable transfer device having a seat defined in the perimeter thereof, said device having one position wherein its said seat is located at the base of said chute in a position to enable a stick at the bottom of said stack lodge in said seat, and being rotatable to another position to place said stick on the upper reach of said placement conveyor belt in the path of a lug carried by said upper reach, and
    means for feeding sticks to the upper end of said chute with such oriented to become stacked side by side in the chute.

* * * * *